(12) United States Patent
Mijuskovic et al.

(10) Patent No.: US 8,082,789 B2
(45) Date of Patent: Dec. 27, 2011

(54) MATCHED MULTIPLIER CIRCUIT HAVING REDUCED PHASE SHIFT FOR USE IN MEMS SENSING APPLICATIONS

(75) Inventors: Dejan Mijuskovic, Chandler, AZ (US); David E. Bien, Glendale, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 753 days.

(21) Appl. No.: 12/244,470

(22) Filed: Oct. 2, 2008

(65) Prior Publication Data

US 2010/0083754 A1 Apr. 8, 2010

(51) Int. Cl.
*G01P 9/04* (2006.01)

(52) U.S. Cl. .................................................. 73/504.12

(58) Field of Classification Search ............... 73/504.12, 73/504.13, 504.14, 504.15, 504.16, 504.04
See application file for complete search history.

(56) References Cited

U.S. PATENT DOCUMENTS 5,983,718 A * 11/1999 Wyse et al. ................. 73/504.12
7,444,868 B2 * 11/2008 Johnson ..................... 73/504.12

* cited by examiner

*Primary Examiner* — John Chapman, Jr.
(74) *Attorney, Agent, or Firm* — Ingrassia Fisher & Lorenz PC

(57) ABSTRACT

Apparatus and methods are provided for multiplier circuits having reduced phase shift. A multiplier circuit comprises an input node for an input signal and an output node for an output signal. A first multiplier is coupled to the input node and has a first multiplier output, wherein the first multiplier multiplies the input signal by a first signal to produce a second signal at the first multiplier output. A second multiplier is coupled to the output node and is matched to the first multiplier. The second multiplier multiplies the output signal by a third signal to produce a fourth signal at a second multiplier output. An amplifier is coupled to the first multiplier output and the second multiplier output and produces the output signal at an amplifier output coupled to the output node based upon the second signal and the fourth signal.

20 Claims, 2 Drawing Sheets

MATCHED MULTIPLIER CIRCUIT HAVING REDUCED PHASE SHIFT FOR USE IN MEMS SENSING APPLICATIONS

TECHNICAL FIELD

Embodiments of the subject matter described herein relate generally to signal multipliers, and more particularly, embodiments of the subject matter relate to multiplier configurations having reduced phase shift for use in MEMS gyroscopes.

BACKGROUND

Microelectromechanical systems (MEMS) are widely used in a variety of sensing applications. For example, vehicle or automotive applications may use MEMS sensors, such as accelerometers or gyroscopes, to determine when to deploy the vehicle airbag or activate a stability and/or traction control system. In addition, consumer electronics devices, such as video game controllers, personal media players, cell phones, and digital cameras, also use MEMS sensors in various applications to detect the orientation and/or respond to rotational movement of the device.

MEMS gyroscopes often employ a small vibrating mass which is driven to resonate within a two-dimensional plane, i.e., the plane of oscillation. When the plane of oscillation is rotated, the Coriolis force causes the vibrating mass to be displaced from the plane of oscillation by an amount proportional to the rate of rotation. In order to determine the rate of rotation, this displacement is measured and converted into an electrical signal which oscillates with the same resonant frequency as the vibrating mass. An in-phase component of this electrical signal is proportional to the rate of rotation. Due to imperfections in manufacturing of the vibrating mass, often, a large unwanted error signal is present as the quadrature component (e.g., shifted 90° relative to the rate of rotation signal component) of the electrical signal. Therefore, in order to determine the rate of rotation, the electrical signal is often demodulated using a carrier signal at the resonant frequency into an in-phase component and a quadrature component. In many systems, a closed-loop control system is created by modulating (or remodulating) the demodulated components in a feedback path and applying the remodulated signals to the vibrating mass to counter the displacement caused by the rotation.

Often, multipliers or mixers are used to multiply the electrical signals by sine and cosine components of the carrier signal to accomplish the demodulation and/or modulation. However, the multiplication circuitry introduces a phase shift in the feedback path of the closed-loop system. This phase shift can cause an unwanted quadrature component to drift into the in-phase component of the remodulated signal, and vice versa, which limits the ability of the feedback signal (or force applied to the vibrating mass) to accurately track the measured signal. In practice, the unwanted quadrature component signal can be several times larger than the full-scale in-phase component signal that represents the rate of rotation. Therefore, even a very small phase shift by the multiplication circuitry can prevent accurate measurement of the rate of rotation and produce unacceptable distortion and offset drift in the output of the gyroscope.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
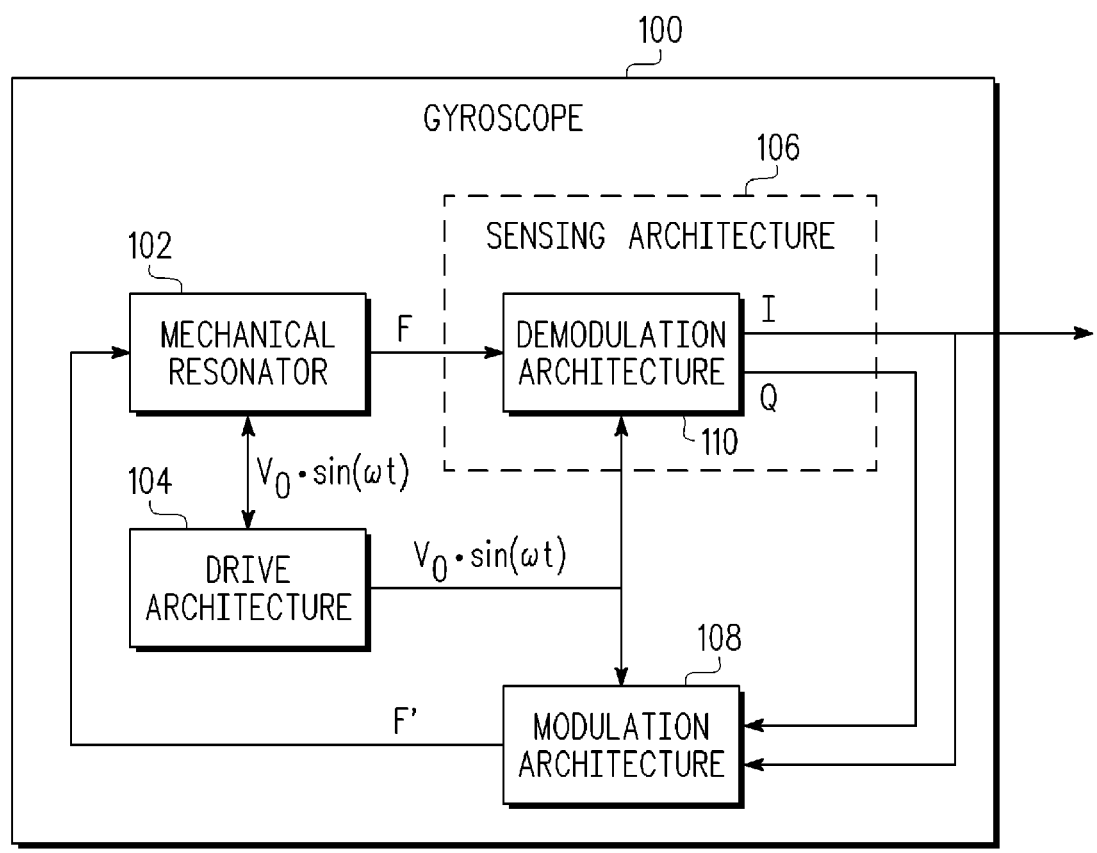
FIG. 1 is a block diagram of a gyroscope in accordance with one embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed description.

The following description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematics shown in the figures depict exemplary arrangements of elements, additional intervening elements, devices, features, or components may be present in an embodiment of the depicted subject matter.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

For the sake of brevity, conventional techniques related to microelectromechanical systems (MEMS) fabrication and development, MEMS sensing, analog circuit design, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. It should be understood that circuitry described herein may be implemented either in silicon or another semiconductor material or alternatively by software code representation thereof. In addition, certain terminology may also be used in the following description for the purpose of reference only, and thus are not intended to be limiting, and the terms "first", "second" and other such numerical terms referring to structures do not imply a sequence or order unless clearly indicated by the context.

Technologies and concepts discussed herein relate to a multiplier circuit having reduced phase shift. The multiplier circuit uses a forward multiplier with and a feedback multiplier each coupled to an operational amplifier. The forward multiplier and the feedback multiplier are matched, that is, chosen or designed such that they have nearly identical transfer functions, and configured in a manner such that the phase shift introduced by the forward multiplier is effectively canceled by the phase shift of the feedback multiplier.

FIG. 1 depicts a gyroscope 100 in accordance with one embodiment. In an exemplary embodiment, the gyroscope 100 is realized using microelectromechanical systems (MEMS) technology. The gyroscope 100 includes, without limitation, a mechanical resonator 102, a driving architecture 104, a sensing architecture 106, and a modulation architecture 108. In an exemplary embodiment, these, and possibly other elements, are cooperatively configured to detect and measure an angular rate of rotation of the gyroscope 100, as described in greater detail below. It should be understood that FIG. 1 is a simplified representation of a gyroscope 100 for purposes of explanation and ease of description, and that practical embodiments may include other devices and components for providing additional functions and features, and/or the gyroscope 100 may be part of a much larger system, as will be understood. Furthermore, although the subject matter may be described herein in the context of a gyroscope, the subject matter is not intended to be limited to any particular application. Various implementation aspects of MEMS gyroscopes are well known and so, in the interest of brevity, many conventional steps will only be mentioned briefly herein or will be omitted entirely without providing the well known details.

In an exemplary embodiment, the mechanical resonator 102 and driving architecture 104 are coupled and cooperatively figured such that a element within the mechanical resonator 102 vibrates or oscillates at a resonant frequency, $\omega$. The mechanical resonator 102 generates a force signal, F, in response to movement of the gyroscope 100, as described in greater detail below. The sensing architecture 106 is coupled to the mechanical resonator 102 and driving architecture 104 and configured to demodulate the force signal, F, into a baseband component, I, indicative of the angular rate of rotation, as described in greater detail below. The modulation architecture 108 is coupled to the mechanical resonator 102, the driving architecture 104 and the sensing architecture 106. The modulation architecture 108 is configured to remodulate the baseband signals produced by the sensing architecture 106 into a feedback force signal, F', which is provided to the mechanical resonator 102 to establish a closed-loop control system. This feedback force signal counters the force resulting from movement of the gyroscope 100, as will be appreciated in the art.

In an exemplary embodiment, the mechanical resonator 102 is realized as a vibrating mass on a semiconductor substrate. Mechanical resonator 102 is preferably configured as an electromechanical oscillator which utilizes electrostatic forces to cause the mass to vibrate or oscillate at a resonant frequency, $\omega$ (or tuning point), in a two-dimensional plane (e.g., the x-y plane). In this regard, the mechanical resonator 102 may include a plurality of electrodes which accumulate charge based on the displacement of the mass. The driving architecture 104 is configured to detect the capacitance change of the electrodes and reapply an electrical force proportional to $V_o \cdot \sin(\omega t)$, such that the mass continues oscillating at the resonant frequency. In response to movement of the gyroscope 100, the oscillating mass generates a force at the resonant frequency, which is normal (or perpendicular) to the plane of oscillation (e.g., along the z-axis). The cosine component of this force, corresponds to the Coriolis force, which is proportional to the angular rate of rotation, as will be appreciated in the art. In an exemplary embodiment, the mechanical resonator 102 includes electrodes configured to detect the displacement of the mass normal to the plane of oscillation (e.g., in the z-direction) and generate a force signal, F.

In an exemplary embodiment, the sensing architecture 106 includes a demodulation architecture 110 configured to demodulate the force signal, F, received from the mechanical resonator 102 into in-phase (I) and quadrature (Q) baseband components (e.g., direct current or steady-state) in a conventional manner. For example, the demodulation architecture 110 may determine the in-phase component of the force signal by multiplying the force signal by a carrier signal comprising a $\cos(\omega t)$ term and determine the quadrature component of the force signal by multiplying the force signal by a carrier signal comprising a $\sin(\omega t)$ term. In an alternative embodiment, the demodulation architecture 110 may be configured to demodulate the force signal using clock signals (or square waves), and in such an embodiment, the driving architecture 104 need not be coupled to the sensing architecture 106. Although not illustrated, the sensing architecture 106 may include control architecture coupled to the output of the demodulation architecture 110, which may utilize various electrical components to provide gain, stability, and linearity to the closed-loop control system, as will be appreciated in the art. Depending on the embodiment, the control architecture may be realized using discrete components, integrated circuits, amplifiers, filters, analog-to-digital converters, digital-to analog converters, digital signal processors, and the like. The sensing architecture 106 is coupled to the output of the gyroscope 100 and configured to provide resulting in-phase output of the sensing architecture, I, which is proportional to the angular rate of rotation of the gyroscope 100, to the output of the gyroscope 100.

As shown in FIG. 1, in an exemplary embodiment, the modulation architecture 108 is configured to remodulate the baseband signal components from the sensing architecture 106 and subsequently combine them to produce a feedback force signal, F'. The feedback force signal is provided to the mechanical resonator 102, which is configured to apply the feedback force signal to the oscillating mass in a manner that counters the force generated by rotating the plane of oscillation. That is, assuming the mass is oscillating in an x-y plane, if the force that results from rotating the plane of oscillation causes the mass to be displaced in a positive z-direction, the feedback force is applied to the mass in the negative z-direction. In an exemplary embodiment, the modulation architecture 108 is configured to modulate the baseband signal components (I and Q) back to the resonant frequency, as will be appreciated in the art. For example, modulation architecture 108 may modulate the baseband signal components by multiplying the in-phase component by a carrier signal comprising a $\cos(\omega t)$ term and multiplying the quadrature component by a carrier signal comprising a $\sin(\omega t)$ term. The remodulated signals may then be mixed, added, or otherwise combined to produce the feedback force signal, F'. It will be appreciated in the art that by virtue of the feedback in the closed-loop system, any phase shift caused by the remodulation of the baseband signal components may negatively impact the ability of the gyroscope 100 to accurately detect and measure the angular rate of rotation.

Figure 2:
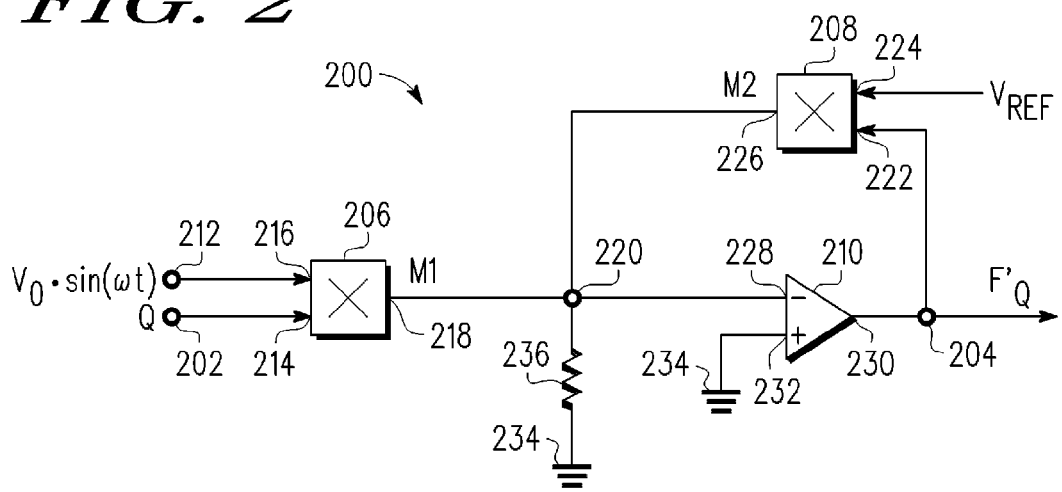
FIG. 2 is a schematic view of an improved multiplier configuration in accordance with one embodiment.

Referring now to FIG. 2, in an exemplary embodiment, a multiplier circuit 200 suitable for use in the gyroscope 100 includes, without limitation, an input node 202, an output node 204, a first multiplier 206, a second multiplier 208, and an amplifier 210. In an exemplary embodiment, the second multiplier 208 is configured as part of a negative feedback path for the amplifier 210. In an exemplary embodiment, the second multiplier 208 is configured such that the phase shift of the second multiplier 208 substantially negates or cancels any phase shift introduced by the first multiplier 206, and thereby reduces the phase shift of an output signal at the output node 204 relative to a carrier signal at node 212, as described in greater detail below.

It should be understood that FIG. 2 is a simplified representation of a multiplier circuit 200 for purposes of explanation and ease of description, and that practical embodiments may include additional devices and components for providing additional functions and features, as will be understood. Furthermore, although FIG. 2 may be described herein in the context of a gyroscope application, the subject matter of FIG. 2 is not intended to be limited to any particular application. Rather, the following description is merely illustrative of the operating characteristics and utility of the multiplier circuits 200 described herein.

In an exemplary embodiment, the first multiplier 206 has a first input 214 coupled to the input node 202 and a second input 216 coupled to node 212. The first multiplier 206 is configured to multiply an input signal received at the input node 202 and a carrier signal received at node 212 and provides the product (M1) at a multiplier output 218 coupled to node 220. The second multiplier 208 has a first input 222 coupled to the output node 204 and a second input 224 configured to receive a reference signal. The second multiplier 208 is configured to multiply the respective signals received at the inputs 222, 224 and provide the product (M2) to a multiplier output 226 coupled to node 220.

In an exemplary embodiment, the first multiplier 206 and the second multiplier 208 are matched, that is, the multipliers 206, 208 are chosen or designed such that they have nearly identical transfer functions. In an exemplary embodiment, the multipliers 206, 208 are realized using the same design and/or circuit topology with the same or identical component values. For example, if the first multiplier 206 is realized using an analog circuit topology, such as a Gilbert cell, the second multiplier 208 is also realized as Gilbert cell using the same or identical components. In this manner, the first multiplier 206 and second multiplier 208 will have substantially identical transfer functions or frequency responses, with the difference being attributed to the variances or tolerances of the individual circuit components. Thus, for a given frequency, each multiplier 206, 208 will produce substantially the same phase shift. In alternative embodiments, the multipliers 206, 208 may be realized using any multiplier topology, circuitry, or hardware, provided they are matched. In an exemplary embodiment, the difference between the phase shift of the first multiplier 206 and the phase shift of the second multiplier 208 is less than 200 microradians for the resonant frequency of the carrier signal at node 212. As described in greater detail below, the multiplier circuit 200 is configured such that the phase shift of second multiplier 208 substantially negates or cancels any phase shift of the first multiplier 206, other than the differences caused by the tolerances or variances in component values.

In an exemplary embodiment, the multiplier outputs 218, 226 are coupled to a first amplifier input 228 at node 220. Based on the signal at the first amplifier input 228 (or node 220), the amplifier 210 is configured to produce the output signal at the amplifier output 230, which in turn is coupled to output node 204. In an exemplary embodiment, the amplifier 210 is realized as a second-order operational amplifier such that it has a negligible amount of phase shift, along with high gain (e.g., a factor of 100,000 or more) and high input impedance. In this regard, the amplifier 210 has a second amplifier input 232, which is preferably coupled to a reference potential 234 (e.g., AC ground or zero volts). In an exemplary embodiment, the amplifier 210 is configured as a negative feedback amplifier wherein the first amplifier input 228 comprises an inverting input and the second amplifier input 232 comprises a non-inverting input. In accordance with one or more embodiments, a resistance element 236 may be coupled between node 220 and the reference potential 234. Alternatively, although not illustrated, the resistance element 236 may be coupled between node 220 and another voltage potential or signal source for the purpose of adjusting DC levels or introducing other signals as may be needed for system operation. In the configuration shown in FIG. 2, the multiplier circuit 200 determines the difference between the signals received at the first amplifier input 228 (or node 220), and the amplifier 210 generates the output signal based on the difference between the signals, as described in greater detail below.

Figure 3:
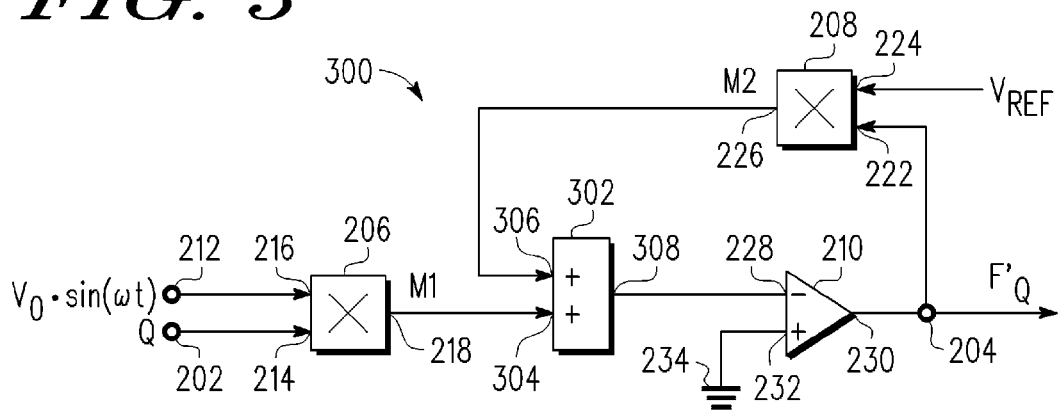
FIG. 3 is a schematic view of an improved multiplier configuration in accordance with another embodiment.

Referring now to FIG. 3, in alternative embodiment, a multiplier circuit 300 suitable for use in the gyroscope 100 includes a summing element 302 coupled between the first multiplier 206, the second multiplier 208, and the amplifier 210. The summing element comprises a first summing input 304, a second summing input 306, and a summing output 308. In this embodiment, the first multiplier output 218 is coupled to the first summing input 304 rather than node 220, and the second multiplier output 226 is coupled to the second summing input 306 rather than node 220. The summing element 302 is configured to add the signal at the first summing input 304, or M1, and the signal at the second summing input 306, or M2, and provide the resulting sum at the summing output 308, which in turn is coupled to the amplifier input 228. It should be appreciated that the multiplier circuit 300 of FIG. 3 is a simplified representation of a multiplier circuit for purposes of explanation and ease of description, and FIG. 3 is not intended to limit the subject matter in anyway. For example, although not illustrated, the summing element 302 may also provide additional summing inputs for the purpose of introducing DC corrections or other signals that may be needed, as will be appreciated in the art. Furthermore, although the multiplier circuit 300 will be subsequently described herein in the context of a gyroscope application, the multiplier circuit 300 is not intended to be limited to any particular application.

Referring again to FIG. 1, with continued reference to FIG. 2 and FIG. 3, in an exemplary embodiment, the modulation architecture 108 is configured to remodulate the quadrature component of the force signal using an improved multiplier circuit 200, 300 having reduced phase shift. Although in other embodiments the multiplier circuit 200, 300 may be used to demodulate (e.g., as part of demodulation architecture 110) and/or modulate both the in-phase and quadrature components, phase shift that occurs in the remodulation of the quadrature component has the most detrimental effects on the overall system. This is because the phase shift causes a portion of the quadrature component to be remodulated and appear as an in-phase component of the feedback force signal, F', and therefore has a greater impact on the output of the system, which is attempting to accurately determine the in-phase component of the measured force signal, F.

In an exemplary embodiment, the modulation architecture 108 is configured to receive the quadrature baseband signal, Q, from the sensing architecture 106 and provide the baseband signal to the input node 202 of the multiplier circuit 200, 300. The modulation architecture 108 is also configured to receive the carrier signal, $V_o \cdot \sin(\omega t)$, from the driving architecture 104 and provide the carrier signal to node 212. The first multiplier 206 multiplies the input baseband signal and the carrier signal to obtain M1. For example, assuming the first multiplier 206 has a transfer function of $H_1(s)$, then in the frequency domain, M1=Q·V$_o$·H$_1$(s). The amplifier 210 generates the output signal at the output node 204 based on M1 and the feedback signal from the second multiplier 208, M2. In an exemplary embodiment, the second multiplier 208 multiplies the output signal by a reference signal, V$_{REF}$, to obtain M2. In accordance with one embodiment, the reference signal is chosen to be one half of the supply voltage for the system. Assuming the second multiplier 208 has a transfer function of H$_2$(s), then in the frequency domain, M2=F$_Q$·V$_{REF}$·H$_2$(s).

By virtue of the configurations in FIG. 2 and FIG. 3, it will be appreciated in the art that due to the feedback configuration and an the relatively large amplifier gain, for any voltage at the amplifier output 230, the voltage at the first amplifier input 228 is substantially equal to the voltage at the second amplifier input 232 (e.g., zero volts). It will be appreciated in the art that in practice, the feedback loop drives the voltage at the first amplifier input 228 toward zero, within the limits of the amplifier gain and loop characteristics, such that M1+M2≈0. Substituting for M1 and M2 and solving for the output signal in the frequency domain provides $$F_Q = -Q \cdot \frac{V_o}{V_{REF}} \cdot \frac{H_1(s)}{H_2(s)}.$$

In an exemplary embodiment, the multipliers 206, 208 are matched such that their respective transfer functions are substantially equal, i.e., H$_1$(s)≈H$_2$(s), and the phase shift of the first multiplier 206 is substantially equal to the phase shift of the second multiplier 208. As a result, the phase shifts introduced by the multipliers 206, 208 are effectively cancelled (e.g., the ratio $$\frac{H_1(s)}{H_2(s)}$$

is equal to one or another value without any s terms), and the output F$_Q$ is substantially in-phase with the carrier signal. In practice however, due to the practical difficulties of perfectly matching the multipliers 206, 208 or obtaining perfectly identical transfer functions for the multipliers 206, 208, the output signal of the multiplier circuit 200, 300 may still exhibit a relatively small phase shift relative to the carrier signal. This reduced phase shift is substantially equal to a difference between the phase shift of the first multiplier 206 and the phase shift of the second multiplier 208. In an exemplary case, the output signal of the multiplier circuit 200, 300 had a phase shift relative to the carrier signal of less than 70 microradians at a resonant frequency of 12.5 kHz, whereas use of a conventional multiplier resulted in a phase shift in the output signal of at least 2 milliradians.

In summary, systems, devices, and methods configured in accordance with example embodiments of the subject matter relate to:

An apparatus is provided for multiplier circuit. The multiplier circuit comprises an input node for an input signal and an output node for an output signal. A first multiplier is coupled to the input node. The first multiplier has a first multiplier output, wherein the first multiplier is configured to multiply the input signal by a first signal to produce a second signal at the first multiplier output. A second multiplier is coupled to the output node. The second multiplier is matched to the first multiplier and has a second multiplier output. The second multiplier is configured to multiply the output signal by a third signal to produce a fourth signal at the second multiplier output. An amplifier is coupled to the first multiplier output and the second multiplier output. The amplifier has an amplifier output coupled to the output node, wherein the amplifier is configured to produce the output signal at the amplifier output based upon the second signal and the fourth signal.

In accordance with one embodiment, the amplifier has a first amplifier input, wherein the multiplier circuit further comprises a summing element. The summing element comprises a first summing input coupled to the first multiplier output, a second summing input coupled to the second multiplier output, and a summing output coupled to the first amplifier input. The summing element is configured to produce a sum of the second signal and the fourth signal at the summing output and the amplifier produces the output signal based upon the sum. In yet another embodiment, the amplifier has a second amplifier input coupled to a reference potential. The first amplifier input may comprise an inverting input and the second amplifier input may comprise a non-inverting input.

In another embodiment, the amplifier has a first input coupled to the first multiplier output and the second multiplier output. The amplifier may further comprise a second input coupled to a reference potential, wherein the first input comprises an inverting input and the second input comprises a non-inverting input. In another embodiment, a resistance element is coupled between the first input and the reference potential. In an exemplary embodiment, a phase shift of the first multiplier is substantially equal to a phase shift of the second multiplier.

In yet another embodiment, an apparatus is provided for a gyroscope for measuring a rate of rotation. The gyroscope comprises a mechanical resonator configured to generate a first signal based on movement of the gyroscope and a feedback signal. A sensing architecture is coupled to the mechanical resonator, and the sensing architecture is configured to demodulate the first signal using a carrier signal to produce a baseband signal. A modulation architecture is coupled to the sensing architecture and the mechanical resonator. The modulation architecture comprises an amplifier having a first input and an output, wherein the amplifier is configured to produce the feedback signal at the output in response to a second signal at the first input. The modulation architecture further comprises a first multiplier having a first multiplier output coupled to the first input of the amplifier, wherein the first multiplier is configured to produce the baseband signal multiplied by the carrier signal at the first multiplier output. The modulation architecture also comprises a second multiplier coupled between the output and the first input of the amplifier. The second multiplier has a second multiplier output coupled to the input of the amplifier, and the second multiplier is configured to produce the feedback signal multiplied by a third signal at the second multiplier output. A transfer function of the second multiplier is substantially matched to a transfer function of the first multiplier.

In accordance with one embodiment, a phase shift of the first multiplier is substantially equal to a phase shift of the second multiplier. In another embodiment, a phase shift of the feedback signal relative to the carrier signal is substantially equal to a difference between a phase shift of the first multiplier and a phase shift of the second multiplier. In yet another embodiment, the amplifier has a second input, wherein the second input is coupled to a reference potential. In a further embodiment, the first input comprises an inverting input and the second input comprises a non-inverting input. A resistance element may be coupled between the first input and the reference potential.

In yet another embodiment, the modulation architecture further comprises a summing element coupled between the first multiplier, the second multiplier, and the amplifier. The summing element comprises a first summing input coupled to the first multiplier output, a second summing input coupled to the second multiplier output, and a summing output coupled to the first input of the amplifier. The summing element is configured to produce the second signal at the summing output by adding the product of the baseband signal and the carrier signal and the product of the feedback signal and the third signal. In another embodiment, the gyroscope further comprises a driving architecture coupled to the mechanical resonator, the sensing architecture, and the modulation architecture. The driving architecture is configured to determine a resonant frequency of the mechanical resonator, wherein the carrier signal is generated based on the resonant frequency.

In another embodiment, a method is provided for reducing a phase shift in an output signal relative to a first signal. The method comprises multiplying an input signal and the first signal using a first multiplier to obtain a second signal, generating the output signal based on the second signal and a feedback signal, and multiplying the output signal and a third signal using a second multiplier to obtain the feedback signal. The second multiplier is configured such that a phase shift of the second multiplier substantially negates a phase shift of the first multiplier.

In accordance with one embodiment, the generating the output signal based on the second signal and the feedback signal comprises determining a difference between the second signal and the feedback signal, and generating the output signal based on the difference between the second signal and the feedback signal. The second multiplier may be configured as a negative feedback path for an amplifier configured to generate the output signal, wherein determining the difference between the second signal and the feedback signal comprises adding the second signal and the feedback signal to obtain a sum, and providing the sum to an inverting input of the amplifier.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application

What is claimed is:

1. A multiplier circuit comprising:
   an input node for an input signal;
   an output node for an output signal;
   a first multiplier coupled to the input node, the first multiplier having a first multiplier output, wherein the first multiplier is configured to multiply the input signal by a first signal to produce a second signal at the first multiplier output;
   a second multiplier coupled to the output node, the second multiplier being matched to the first multiplier and having a second multiplier output, wherein the second multiplier is configured to multiply the output signal by a third signal to produce a fourth signal at the second multiplier output; and
   an amplifier coupled to the first multiplier output and the second multiplier output, the amplifier having an amplifier output coupled to the output node, wherein the amplifier is configured to produce the output signal at the amplifier output based upon the second signal and the fourth signal.

2. The multiplier circuit of claim 1, the amplifier having a first amplifier input, wherein the multiplier circuit further comprises a summing element comprising:
   a first summing input coupled to the first multiplier output;
   a second summing input coupled to the second multiplier output; and
   a summing output coupled to the first amplifier input, wherein the summing element is configured to produce a sum of the second signal and the fourth signal at the summing output and the amplifier produces the output signal based upon the sum.

3. The multiplier circuit of claim 2, wherein the amplifier has a second amplifier input coupled to a reference potential.

4. The multiplier circuit of claim 3, wherein the first amplifier input comprises an inverting input and the second amplifier input comprises a non-inverting input.

5. The multiplier circuit of claim 1, wherein the amplifier has a first input coupled to the first multiplier output and the second multiplier output.

6. The multiplier circuit of claim 5, wherein the amplifier has a second input coupled to a reference potential.

7. The multiplier circuit of claim 6, wherein the first input comprises an inverting input and the second input comprises a non-inverting input.

8. The multiplier circuit of claim 6, further comprising a resistance element coupled between the first input and the reference potential.

9. The multiplier circuit of claim 1, wherein a phase shift of the first multiplier is substantially equal to a phase shift of the second multiplier.

10. A gyroscope for measuring a rate of rotation, the gyroscope comprising:
    a mechanical resonator configured to generate a first signal based on movement of the gyroscope and a feedback signal;
    a sensing architecture coupled to the mechanical resonator, the sensing architecture being configured to demodulate the first signal using a carrier signal to produce a baseband signal; and
    a modulation architecture coupled to the sensing architecture and the mechanical resonator, the modulation architecture comprising:
       an amplifier having a first input and an output, wherein the amplifier is configured to produce the feedback signal at the output in response to a second signal at the first input;
       a first multiplier having a first multiplier output coupled to the first input of the amplifier, the first multiplier being configured to produce the baseband signal multiplied by the carrier signal at the first multiplier output; and
       a second multiplier coupled between the output and the first input of the amplifier, the second multiplier having a second multiplier output coupled to the input of the amplifier, the second multiplier being configured to produce the feedback signal multiplied by a third signal at the second multiplier output; wherein a transfer function of the second multiplier is substantially matched to a transfer function of the first multiplier.

11. The gyroscope of claim 10, wherein a phase shift of the first multiplier is substantially equal to a phase shift of the second multiplier.

12. The gyroscope of claim 10, wherein a phase shift of the feedback signal relative to the carrier signal is substantially equal to a difference between a phase shift of the first multiplier and a phase shift of the second multiplier.

13. The gyroscope of claim 10, the amplifier having a second input, wherein the second input is coupled to a reference potential.

14. The gyroscope of claim 13, wherein the first input comprises an inverting input and the second input comprises a non-inverting input.

15. The gyroscope of claim 14, further comprising a resistance element coupled between the first input and the reference potential.

16. The gyroscope of claim 10, wherein the modulation architecture further comprises a summing element coupled between the first multiplier, the second multiplier, and the amplifier, the summing element comprising:
   a first summing input coupled to the first multiplier output;
   a second summing input coupled to the second multiplier output; and
   a summing output coupled to the first input of the amplifier, wherein the summing element is configured to produce the second signal at the summing output by adding the product of the baseband signal and the carrier signal and the product of the feedback signal and the third signal.

17. The gyroscope of claim 10, further comprising a driving architecture coupled to the mechanical resonator, the sensing architecture, and the modulation architecture, the driving architecture being configured to determine a resonant frequency of the mechanical resonator, wherein the carrier signal is generated based on the resonant frequency.

18. A method for reducing a phase shift in an output signal relative to a first signal, the method comprising:
   multiplying an input signal and the first signal using a first multiplier to obtain a second signal;
   generating the output signal based on the second signal and a feedback signal; and
   multiplying the output signal and a third signal using a second multiplier to obtain the feedback signal, wherein the second multiplier is configured such that a phase shift of the second multiplier substantially negates a phase shift of the first multiplier.

19. The method of claim 18, wherein generating the output signal based on the second signal and the feedback signal comprises:
   determining a difference between the second signal and the feedback signal; and
   generating the output signal based on the difference between the second signal and the feedback signal.

20. The method of claim 19, the second multiplier being configured as a negative feedback path for an amplifier configured to generate the output signal, wherein determining the difference between the second signal and the feedback signal comprises:
   adding the second signal and the feedback signal to obtain a sum; and
   providing the sum to an inverting input of the amplifier.

* * * * *